(12) United States Patent
Sonoda et al.

(10) Patent No.: US 6,206,574 B1
(45) Date of Patent: Mar. 27, 2001

(54) BALL BEARING AND METHOD OF ASSEMBLING THE SAME

(75) Inventors: Hirotetsu Sonoda; Tatsuya Fukushima, both of Saitama (JP)

(73) Assignee: Bosch Braking Systems Co., Ltd. (JP)

( * ) Notice: Subject to any disclaimer, the term of this patent is extended or adjusted under 35 U.S.C. 154(b) by 0 days.

(21) Appl. No.: 09/193,382

(22) Filed: Nov. 17, 1998

(30) Foreign Application Priority Data

Nov. 25, 1997 (JP) ..................................... 9-323308

(51) Int. Cl.⁷ ..................................................... F16C 19/06
(52) U.S. Cl. ............................................................ 384/507
(58) Field of Search ................................... 384/507, 508, 384/509, 510, 560

(56) References Cited

U.S. PATENT DOCUMENTS

2,643,165   6/1953   Potter ................................. 384/507

*Primary Examiner*—Lenard A. Footland
(74) *Attorney, Agent, or Firm*—Townsend and Townsend and Crew LLP; Kenneth R. Allen (57) ABSTRACT

A ball bearing includes a rotary member, an outer ring, and a plurality of balls. Part of the rotary member serves as an inner ring. The outer ring is fitted on an outer circumferential portion of the inner ring. The plurality of balls are incorporated in ball holding grooves between the inner and outer rings. At least one of the inner and outer rings has a stepped portion in a circumferential surface thereof close to the ball holding grooves. The stepped portion prevents positional shift of the balls incorporated through a gap between the inner ring and the outer ring set eccentric with respect to the inner ring. A method of assembling a ball bearing is also disclosed.

4 Claims, 9 Drawing Sheets

BALL BEARING AND METHOD OF ASSEMBLING THE SAME

BACKGROUND OF THE INVENTION

The present invention relates to a ball bearing used for rotatably, axially supporting a rotary member on a fixing portion and a method of assembling the same and, more particularly, to a ball bearing in which part of a rotary member serves as an inner ring and a method of assembling the same.

A ball bearing of this type is generally used for rotatably or pivotally, axially supporting a rotary member or rotating shaft in the holding hole of a holding member as a stationary member. As the ball bearing of this type, one in which an inner ring is integrally formed with part of the rotary member is conventionally known.

This ball bearing is assembled by fitting an outer ring on an inner ring portion formed in part of the rotary member, incorporating a plurality of balls between the inner and outer rings, arranging the balls in an annular gap between the inner and outer rings equidistantly at predetermined distances in the circumferential direction, and thereafter mounting a holder for maintaining the gap of the balls.

In assembly of the ball bearing described above, when the rotary member is a shaft member, an assembly jig which has a hole portion for holding the shaft member extending in it is used. More specifically, the outer ring is fitted on the inner ring portion of the rotary member which projects upward on the assembly jig. This outer ring is set on one side with respect to the inner ring so as to be eccentric. The gap between the inner and outer rings is partially increased. The plurality of balls are incorporated through this large gap portion. The outer ring is located to be concentric with the inner ring, so that the balls are interposed between the inner and outer rings. The balls that are set on one side are located at predetermined distances in the annular gap between the inner and outer rings so as to be equidistant from each other. Thereafter, the holder having pawl portions for maintaining the gap of the balls is mounted.

Such a ball bearing is used in, e.g., a rack-pinion type power steering apparatus, to rotatably hold a pinion shaft, integrally formed with a sleeve serving as the outer valve member of a rotary type channel selector valve (rotary valve), on a steering body serving as a stationary portion. It is proposed to rotatably, axially support the pinion shaft on the steering body by using a ball bearing in which the end portion of the pinion shaft described above serves as the inner ring. With this arrangement, a ball bearing that requires a space in the direction of diameter can be incorporated in a steering body, which has been demanded to be made compact, comparatively easily.

In this power steering apparatus, when the apparatus operates, a large load sometimes acts on the pinion shaft integrally formed with the sleeve serving as the outer valve member constituting the rotary type channel selector valve, to cause deformation. Then, decentering and offset contact occur between the sleeve and the rotor serving as the inner valve member, and a smooth valve action cannot accordingly be obtained. For this reason, a ball bearing which is expected to perform reliable axial support is generally used.

In the conventional ball bearing described above, when fitting the outer ring on the outer circumferential side of the rotary member serving as the inner ring and incorporating and interposing a plurality of balls between the inner and outer rings, it is difficult to interpose the balls at predetermined portions between the inner and outer rings.

In the rotary type channel selector valve of the power steering apparatus described above, the pinion shaft having the sleeve serving as the outer valve member is an elongated shaft member, and a large-diameter portion, a small-diameter portion, grooves, and gears are formed on its outer circumferential portion. To assemble such a ball bearing in which the shaft end portion of the pinion shaft serves as the inner ring, the following operation is required. More specifically, the pinion shaft is held by the assembly jig substantially vertically. The outer ring is fitted on the inner ring portion. The outer ring is set on one side to increase the gap between the inner and outer rings. The plurality of balls are incorporated through this large gap portion, and the outer ring is moved to be located concentric with the inner ring. Then, the balls are moved to predetermined equidistant positions. This assembly, however, has a problem in that it requires skills.

This problem will be described in detail. When assembling the ball bearing described above, if the balls are incorporated through the gap between the inner ring and the outer ring which is set on one side, the balls cause positional errors more than necessary between the inner and outer rings and sometimes drop accordingly. More specifically, when the outer ring is set on one side as described above and the balls are incorporated in the gap between the inner and outer rings, the balls, especially the centers of the balls, shift below the edges of the groove-side edges of ball holding grooves respectively formed in the outer circumferential surface of the inner ring and the inner circumferential surface of the outer ring. Then, the outer ring cannot be moved to be concentric with the inner ring. Even if the outer ring is moved, the balls cannot be held in the ball holding grooves between the inner and outer rings.

Therefore, in assembly of the ball bearing in which part of the rotary member serves as the inner ring, as described above, assembly of incorporating the balls between the inner and outer rings and holding the balls in the ball holding grooves requires the greatest care, is cumbersome, and has poor operability, posing many problems in achieving automatic assembly which has been sought for in recent years.

The balls are shifted below as described above because the amount of eccentricity, which is caused when the outer ring is set eccentrically with respect to the inner ring in order to incorporate the balls between the inner and outer rings, is larger than necessary. This is due to the following reason. To incorporate the balls between the inner and outer rings, a gap larger than the ball diameter is necessary. If the outer ring is to be simply set eccentric, the outer ring can be set eccentric until its inner circumferential surface comes into contact with the outer circumferential surface of the inner ring. Although depending on the sizes of the respective portions, the outer ring becomes largely eccentric to exceed the ball diameter, and the balls undesirably pass through the gap between the inner and outer rings.

The problem of operability during assembly appears conspicuously when the balls cannot but be incorporated only in one direction. For example, assume that the pinion shaft has a complicated shape, like the pinion shaft serving also as the outer valve member (sleeve) of the rotary type channel selector valve in a rack-pinion type power steering apparatus, and that a flange portion to mount a seal ring on it projects close to a portion serving as the inner ring. In this case, unlike in assembly of an ordinary ball bearing, the balls cannot but be incorporated only in one direction. The above problem appears conspicuously in such a case.

SUMMARY OF THE INVENTION

The present invention has been made in order to solve the above problems, and has as its object to provide a ball bearing, in which excessive shift of balls incorporated between inner and outer rings during assembly of the ball bearing is prevented so that the assembly operation can be facilitated, and which can be automatically assembled, and a method of assembling the same.

In order to achieve the above object, according to the present invention, there is provided a ball bearing comprising a rotary member, part of which serves as an inner ring, an outer ring fitted on an outer circumferential portion of the inner ring, and a plurality of balls incorporated in ball holding grooves between the inner and outer rings, wherein at least one of the inner and outer rings has, in a circumferential surface thereof close to the ball holding grooves, a stepped portion for preventing positional shift of the balls incorporated through a gap between the inner ring and the outer ring set eccentric with respect to the inner ring.

DESCRIPTION OF THE PREFERRED EMBODIMENT

FIGS. 1A and 1B, 2A and 2B, 3, 4, and 5A and 5B show an embodiment in which a ball bearing and a method of assembling the same according to the present invention is applied to a rack-pinion type power steering apparatus. In these drawings, an example of a rack-pinion type power steering apparatus to which the present invention is applied will be described with reference to FIG. 4 and FIGS. 5A and 5B.

Figure 4:
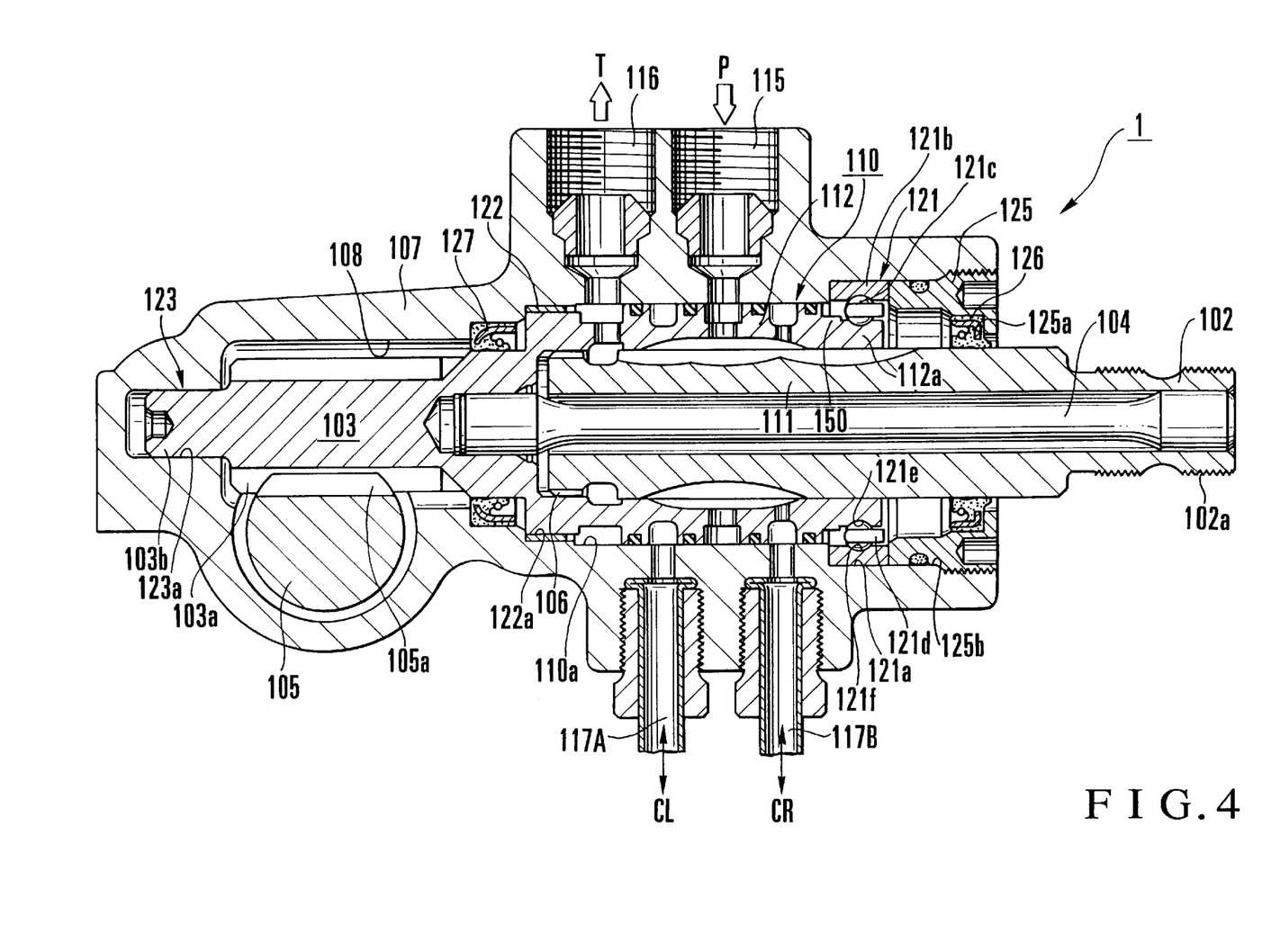
FIG. 4 is a sectional view for explaining the apparatus main body of a rack-pinion type power steering apparatus adopting a ball bearing and a method of assembling the same according to the present invention.

Referring to FIG. 4, reference numeral 101 denotes the power steering main body portion of the rack-pinion type power steering apparatus; 102, a cylindrical stub shaft serving as an input shaft connected to a steering wheel (not shown); 103, a pinion shaft; and 104, a torsion bar having one end fixed to one end of the stub shaft 102, extending toward the other end (to the left in FIG. 4) of the stub shaft 102, and connected to the pinion shaft 103 at its other end (inner end). A cylindrical rotor 111 is arranged to cover the torsion bar 104 along the extending direction of the torsion bar 104.

Since it is integrally formed with the stub shaft 102, the rotor 111 is integrally connected to the stub shaft 102. A sleeve 112 is arranged around the rotor 111. The sleeve 112 has one end integrally formed with the pinion shaft 103 so that it is integrally connected to the pinion shaft 103. A rotary type channel selector valve 110 is formed between the rotor 111 and sleeve 112. Pinion teeth 103a that mesh with rack teeth 105a on a rack 105 constituting a steering link mechanism (not shown) are formed on the pinion shaft 103.

Between the outer circumferential end of the rotor 111 away from the stub shaft 102 and the inner wall of the sleeve 112 near a portion integrally connected to the pinion shaft 103, a safety spline portion 106 constituted by projecting portions and groove portions is arranged as a fail safe mechanism that allows relative rotational displacement within a predetermined angular range caused by the torsion of the torsion bar 104.

The torsion bar 104 has the inner end pressed into and fixed with the pinion shaft 103 and an outer end extending through the stub shaft 102 to the outer end (right end) of the stub shaft 102. The stub shaft 102 is integrally connected to the torsion bar 104 at its serrated portion 102a to be coupled to the stub shaft 102 on the steering wheel side, through a welding means by, e.g., welding the entire circumferential portion of the serrated portion 102a to the torsion bar 104. When connection is performed by welding the entire circumferential portion of the serrated portion 102a in this manner, hole formation and pin driving become unnecessary, and moreover an O-ring serving as a seal member also becomes unnecessary.

Reference numeral 107 denotes a steering body constituting the power steering main body. The steering body 107 is constituted by an integral structure serving also as a valve housing for the rotary type channel selector valve 110 (to be described later).

The stub shaft 102 and pinion shaft 103 are rotatably supported by axial support portions where they are directly received by bearings (to be described later) and the steering body 107. Oil seals are interposed at appropriate positions of the stub shaft 102 and pinion shaft 103.

Figure 5A:
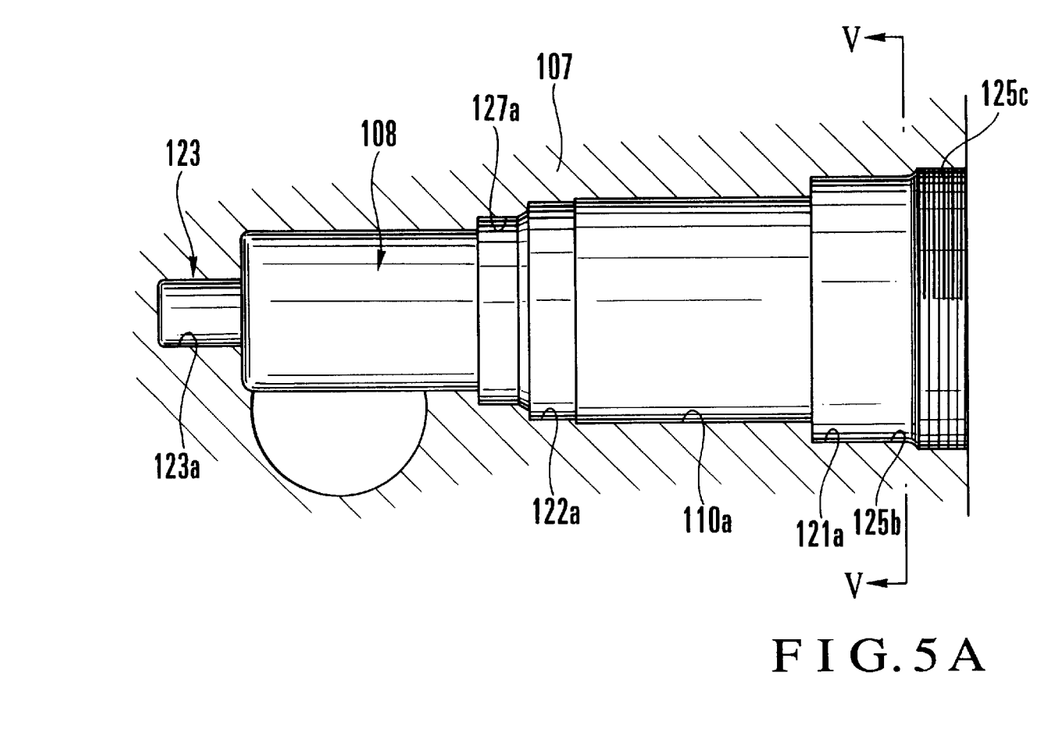
FIG. 5A is a sectional view showing a stepped hole forming a space for incorporating the steering body shown in FIG. 4.
Figure 5B:
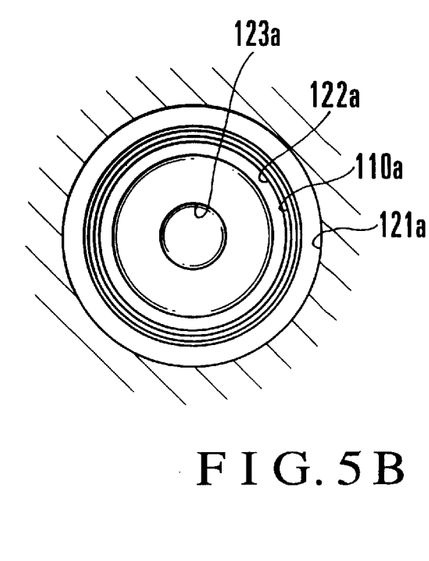
FIG. 5B is a sectional view taken along the line V—V of FIG. 5A.

A stepped hole 108 serving as an incorporating space is formed in the steering body 107. The inner diameter of the stepped hole 108 decreases stepwise from one end on the stab shaft 102 side toward the other end, as shown in FIGS. 5A and 5B, so that the stab shaft 102, torsion bar 104, and pinion shaft 103 described above are formed in it. An assembly constituted by the stab shaft 102 having the rotor 111, and the pinion shaft 103 having the torsion bar 104 and pinion shaft 103 is incorporated in this stepped hole 108. The three portions of this assembly are axially supported by a ball bearing 121, a bush 122, and an axial support 123 which is directly supported on the steering body 107, as shown in FIG. 4. Hence, the entire portion of the assembly is pivotally, axially supported.

Referring to FIGS. 5A and 5B, a hole portion 123a forms the axial support 123 that axially supports the distal end portion of the pinion shaft 103. A hole portion 127a holds an oil seal 127 (to be described later). A hole portion 122a axially supports the bush 122. A hole portion 110a holds the sleeve 112 of the rotary type channel selector valve 110. A hole portion 121a holds the ball bearing 121. Reference numeral 125b denotes the hole portion of a plug member 125 (to be described later). Reference numeral 125c denotes the threaded portion for screwing the plug member 125. The threaded portion 125c is formed as the stepped hole 108 such that its diameter gradually increases from the hole portion 123a.

In this embodiment, the stepped hole 108 serving as the incorporating space (described above) is formed by boring the steering body 107 from one end side. These plurality of hole portions having different diameters can be formed at high precision to maintain complete concentricity, and can be worked easily. When components to be incorporated in the stepped hole 108 which opens in one direction are incorporated in an assembled state, assembly becomes easy, and concentricity among the respective members that are assembled together can be ensured.

Referring to FIG. 4, in the incorporating space 108 in the steering body 107, the rotor 111 connected to the stub shaft 102 and constituting the rotary type channel selector valve 110, and the sleeve 112 integrally connected to one end of the pinion shaft 103 are arranged on the same axis so as to oppose each other. Channel selection between an oil pump P or an oil tank T (neither are shown) and right and left cylinder chambers CR and CL of the power cylinder is performed by relative rotational displacement (torsion of the torsion bar 104) of the rotor 111 and the sleeve 112, as is known widely. In order to perform this channel selecting operation, a plurality of channel grooves are formed at predetermined intervals in the circumferential direction as valve grooves in the outer and inner circumferential surfaces, respectively, of the rotor 111 and sleeve 112 that oppose and are in slidable contact with each other. A plurality of fluid supply holes and fluid discharge holes are formed in appropriate portions of the outer and inner circumferential surfaces, respectively, of the rotor 111 and the sleeve 112 by boring. When these channel grooves and the like are selectively connected and disconnected, the hydraulic circuit is selectively controlled as required.

In FIG. 4, reference numeral 115 denotes an inlet port through which the hydraulic oil flows from the oil pump P; 116, a return port through which the hydraulic oil returns to the oil tank T; and 117A and 117B, left and right output ports connected to the left and right cylinder chambers CL and CR, respectively, of the power cylinder. When the rotary type channel selector valve 110 (described above) rotationally displaces upon the steering operation, the hydraulic channels among these ports are arbitrarily connected and disconnected, thereby controlling generation of an auxiliary steering force in the power cylinder (not shown), as is known widely.

Referring to FIG. 4, the sleeve 112 constituting the rotary type channel selector valve 110 is integrally formed on the pinion shaft 103. The pinion shaft 103 is axially supported by the steering body 107 at the two end portions of the sleeve 112 connected to the pinion shaft 103 through the ball bearing (rolling bearing) 121 and the bush 122. A small-diameter distal end portion 103*b* of the pinion shaft 103 (described above) is axially supported by the axial support 123 which is a recess formed in the steering body 107. The bearing gap between the axial support 123 and pinion shaft 103 is within the allowable bending stress of the pinion shaft 103 and slightly larger than the bearing gap between the pinion shaft 103 and the axial support portions constituted by the bearing 121 and 122 (the ball bearing and bush) at the two end portions of the sleeve 112.

In the ball bearing 121, a small-diameter cylindrical portion 112*a*, which is integral with the pinion shaft 103 and formed at the end portion of the sleeve 112 away from the pinion shaft 103, serves as the inner ring. An outer ring 121*b* is fitted around the inner ring 112*a*, and a plurality of balls 121*c* are interposed between the inner and outer rings 112*a* and 121*b*. Referring to FIG. 4, reference numeral 125 denotes a plug member. The plug member 125 is incorporated and fixed to threadably engage with the open end (on the stab shaft 102 side) of the incorporating space 108 and serves as a set member. The inner end of the plug member 125 abuts against the outer ring 121*b* of the ball bearing 121. Thus, the outer ring 121*b* is locked between the ball bearing 121 and the stepped portion formed by the hole portion 121*a* of the steering body 107.

The plug member 125 is formed with an opening that holds the rotor 111 integral with the stub shaft 102 while the rotor 111 extends through the opening. A holding groove 125*a* for holding an oil seal 126 is formed in this opening portion. The rotor 111 integrally formed with the stub shaft 102 is pivotally inserted into the steering body 107 through the oil seal 126, and is sealed by the oil seal 126. Another oil seal 127 is disposed also at a portion of the sleeve 112 integrally formed on the pinion shaft 103 nearer the pinion teeth 103*a* than the bush 122. A working fluid is filled between the oil seals 126 and 127. Since the bush 122 for supporting one end of the rotor 111 is arranged in this working fluid, it has excellent bearing performance and excellent durability.

The hole portion 122*a* for holding the bush 122 is formed to have a diameter slightly smaller than that of the hole portion 110*a* for holding the sleeve 112 of the rotary type channel selector valve 110. This is to prevent the inner surface of the hole portion 110*a*, which pivotally holds the sleeve 112 constituting the rotary type channel selector valve 110, from being damaged by the bush 122 when incorporating the assembly into the steering body 107. If such a problem does not exist, the hole portion 122*a* and the hole portion 110*a* can be formed to have the same diameter.

With the arrangement described above, since the pinion shaft 103 is axially supported by the steering body 107 through the axial supports (121, 122) at the two end portions of the sleeve 112 which pose the serious problem in the valve action, deformation of the sleeve 112 at these portions is small and the valve action is smooth, thereby obtaining a smooth steering feeling. In particular, even if a light load such as a bending force acts on the pinion shaft 103, no bending deformation occurs in the sleeve 112, and the valve action of the rotary type channel selector valve 110 for obtaining an auxiliary steering force can be performed smoothly. Even if a large load acts on the pinion teeth 103*a* of the pinion shaft 103, an influence on the sleeve 112 can be reduced, and the valve action at the sleeve 112 can be performed smoothly regardless of whether the load acts on the pinion teeth 103*a*.

Since the sleeve 112 constituting the rotary type channel selector valve 110 is integrally formed on the pinion shaft 103, the number of constituent components is small, and the number of portions to be worked is small, so that working and assembly operations are facilitated and the structure becomes simple. With this arrangement, a backlash that poses a problem during operation does not occur between the pinion shaft 103 and sleeve 112, and the rigidity becomes excellent. Furthermore, in the conventional general apparatus structure, the sleeve 112 and the pinion shaft 103 are formed as separate members. When the sleeve 112 and pinion shaft 103 are connected to each other through a connecting portion, the size of the sleeve 112 and pinion shaft 103 as a whole increases in the radial direction due to the presence of the connecting portion. Since the valve housing portion is formed separately from the steering body 107, the number of components increases, and the working and assembly operations become cumbersome. However, with the arrangement described above, these problems do not occur.

Since the stepped hole 108 serving as the incorporating space 108 in the steering body 107 where the pinion shaft 103 and stub shaft 102 are incorporated can be formed to open only on the stub shaft 102 side so as to decrease its diameter stepwise toward its distal end, its inner diameter can be worked by one-directional boring. Also, the assembly operation can be performed easily by incorporating, mounting, and pressing the pinion shaft 103 and stub shaft 102 from one direction. Therefore, automatic assembly is possible.

In this embodiment, since the sleeve 112 is integrally formed on the pinion shaft 103 and the sleeve 112 is formed to have the same diameter as that of the large-diameter portion of the pinion shaft 103, the steering body 107 and the valve body can be integrally formed, and a reduction in size can be achieved. With this straight structure constituted by the pinion shaft 103 and sleeve 112, the rotor 111 to be incorporated in this straight structure can be formed straight to have the same diameter as that of the stub shaft 102, thereby improving the workability of the stub shaft 102. As described above, since the distal end portion 103b of the pinion shaft 103 is axially supported by the axial support 123 having a bearing gap slightly larger than that of the bearings 121 and 122 described above, a large support strength can be maintained over the entire pinion shaft 103, and no problem occurs in the durability.

In this arrangement, the pinion shaft 103 integrally formed with the sleeve 112 is supported at three apparent points, i.e., the two bearings 121 and 122 at the two ends of the sleeve 112 and the axial support 123 of the distal end portion 103b of the pinion shaft 103. In practice, however, when, for example, the acting load is small, the pinion shaft 103 is supported at two points, i.e., at the two ends of the sleeve 112. Therefore, the valve action in travel particularly along an almost straight road can be performed smoothly.

Since the bearing gap of the axial support 123 at the distal end portion 103b of the pinion shaft 103 is large and the degree of freedom in elasticity at the pinion teeth 103a is large, when the pinion teeth 103a mesh with the rack teeth 105a, even if the gear working precision is poor, this poor working precision can be absorbed. Since the rack teeth 105a and pinion teeth 103a can mesh smoothly, a smooth steering feeling can be obtained. Since the meshing gap with respect to the gear precision is not backlash among the constituent components, knocking does not occur in steering and kicking back. Since the axial support 123 at the distal end portion 103b of the pinion shaft 103 functions only when a large load acts, which does not much influence the steering feeling, even if the pinion shaft 103 is received not by a comparatively expensive needle bearing but directly by a bush or the steering body 107, the steering feeling does not suffer.

In the embodiment described above, since the incorporating space 108 is formed by boring the steering body 107 from one side, the concentricity of the members incorporated in it can be maintained, and these members can be assembled easily. Furthermore, in this embodiment, the rotor 111 is axially supported on the inner circumferential portion of the sleeve 112 of the pinion shaft 103 to be integral with the stub shaft 102 through direct axial support of the steering body 107. While the concentricity of the rotor 111 and sleeve 112 is maintained by this direct axial support, the rotor 111 and sleeve 112 can be pivotally supported by the steering body 107.

In this case, at least one of the outer circumferential surface of the rotor 111 and the inner circumferential surface of the sleeve 112 (particularly the inner circumferential surface of the sleeve 112) that come into slidable contact with each other may be subjected to friction decreasing treatment. As such friction decreasing treatment, for example, low-temperature sulphurizing treatment, manganese phosphate treatment, gas soft nitriding treatment, Teflon dispersion type electroless nickel-phosphorus composite plating, molybdenum disulfide baking, Teflon coating, and plasma-CVD ceramic-based hard film treatment are possible, and either one of them may be performed.

Among the friction decreasing treatments described above, low-temperature sulphurizing treatment is one of film-formation surface heat treatments that can form a thin FeS film by a chemical reaction in a solution, and has advantages in that high size precision and high shape precision can be easily obtained and that high surface precision can be maintained at the level of the material. These rotor 111 and sleeve 112 pivot only through a small angle relative to each other. When the rotor 111 and sleeve 112 are subjected to the above surface treatment, the cost is decreased when compared to a case wherein separate bearings are provided.

According to the present invention, in the power steering main body 101 having the structure as described above, the assembly structure of the ball bearing 121 used for axially supporting the shaft end portion (small-diameter cylindrical portion 112a) of the pinion shaft 103, that serves as the sleeve 112 of the rotary type channel selector valve 110, on the steering body 107 is improved.

More specifically, in this embodiment, the small-diameter cylindrical portion 112a of the pinion shaft 103 serving as the rotary member is used as the inner ring. The outer ring 121b is fitted around the outer side of the inner ring 112a. The plurality of (12 in this embodiment) balls 121c are interposed between the inner and outer rings 112a and 121b.

Figure 10:
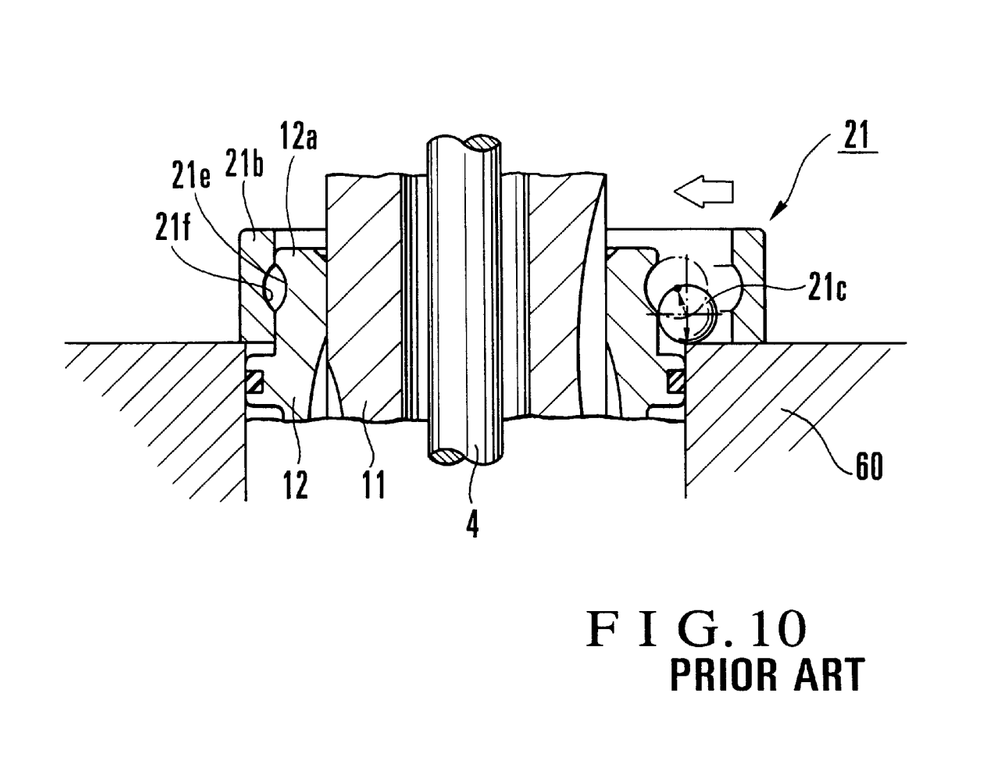
FIG. 10 is a sectional view showing the main part to explain trouble when assembling a conventional ball bearing.

In the ball bearing 121 having the above arrangement, an annular stepped portion 150 constituted by a slightly large-diameter annular projection is formed on the proximal end portion (a portion close to the end portion), close to the sleeve 112, of the small-diameter cylindrical portion 112a described above. The stepped portion 150 serves as a means for preventing shift of the balls 121c during assembly. The extending length of the stepped portion 150 toward the distal end side is determined considering the workability during assembly of the ball bearing 121, as shown in FIGS. 1A and 1B, and FIG. 10 which shows a prior art.

This will be described in detail. The ball bearing 121 described above uses an assembly jig 160 which holds the sleeve 112, through which the stab shaft 102 (rotor 111) and the torsion bar 104 extend, such that its small-diameter cylindrical portion 112a extends through the ball bearing 121 vertically upward. The outer ring 121b is fitted around the small-diameter cylindrical portion 112a, serving as the inner ring, as the center, and is decentered to one side in the planar direction so as to be eccentric. In this state, as shown in FIGS. 1A and 2A, the plurality of (12) balls 121c are sequentially placed in a crescent gap 121g formed between the inner and outer rings 112a and 121b.

Figure 1A:
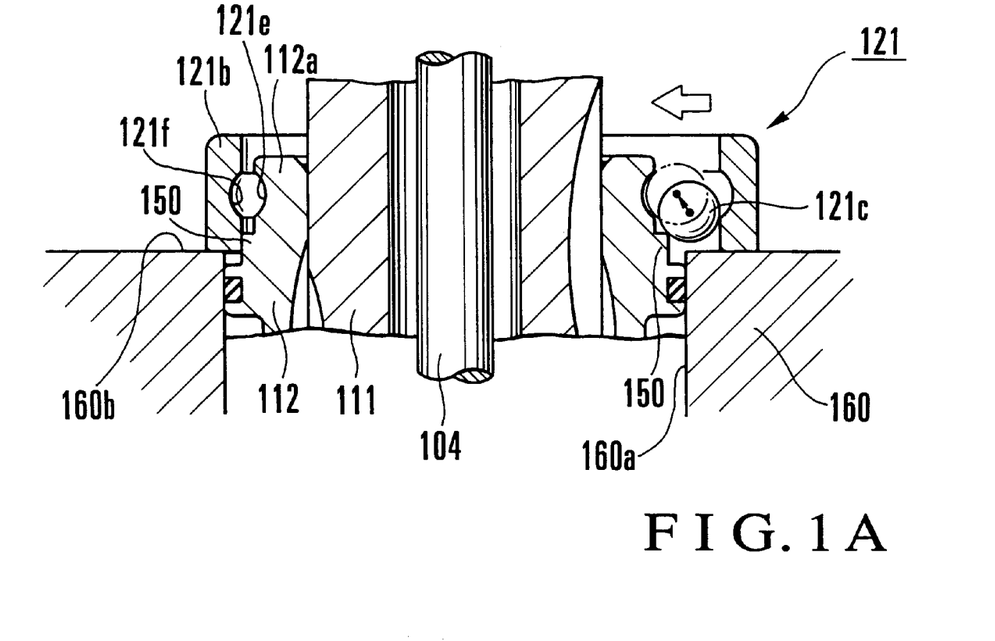
FIGS. 1A and 1B are sectional views showing the main part in an assembly process of a ball bearing.
Figure 1B:
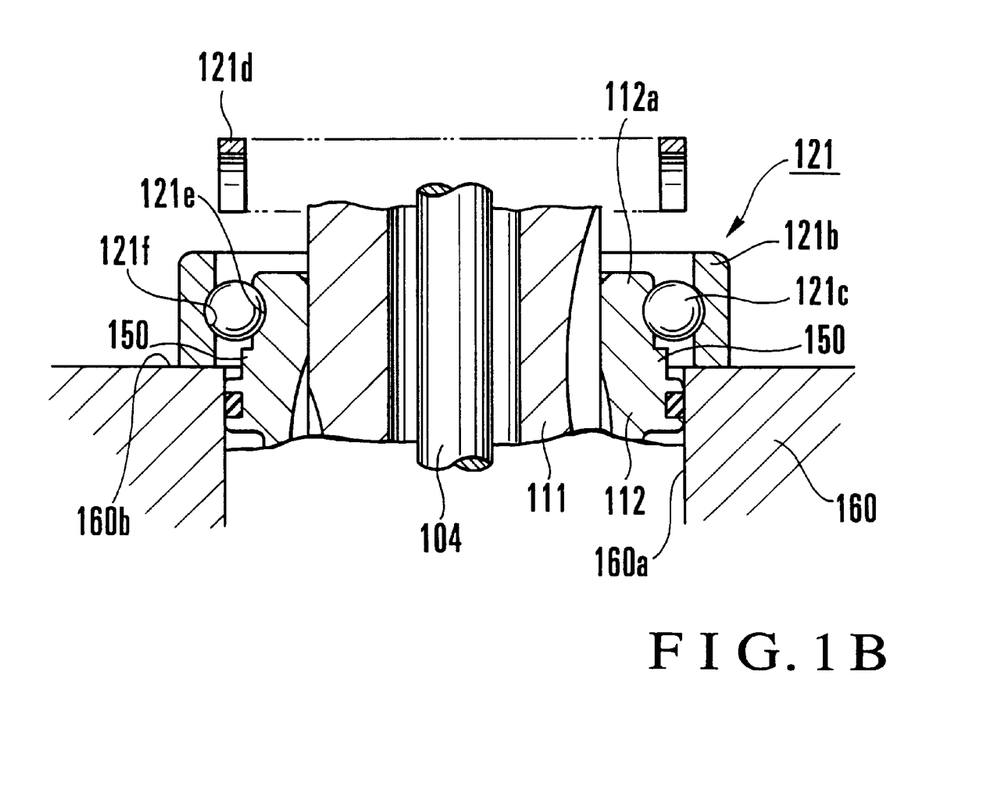
Figure 2A:
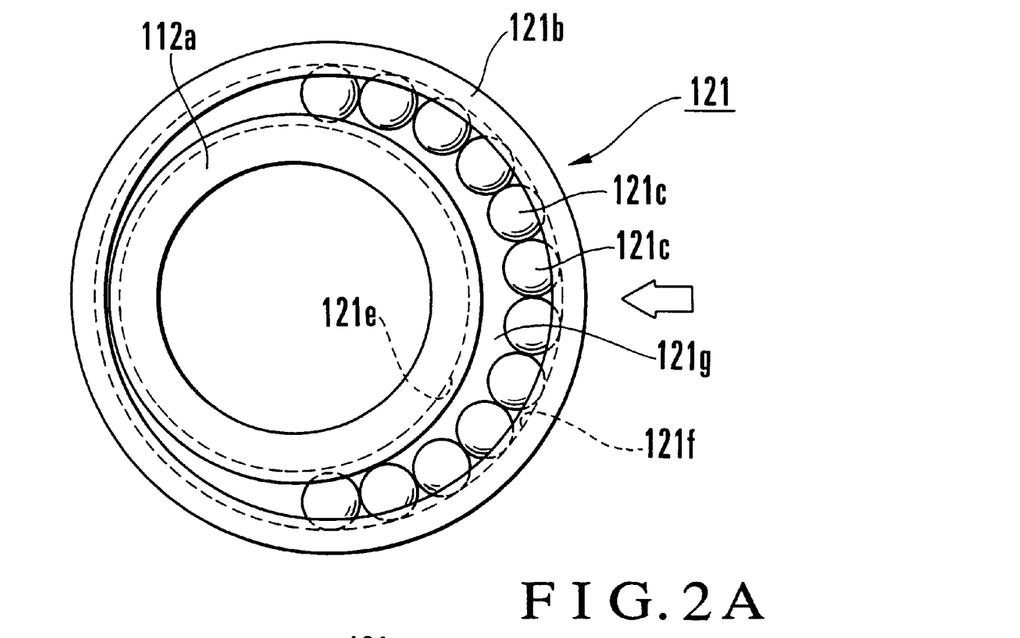
FIGS. 2A and 2B are plan views for explaining the assembly process of the ball bearing shown in FIGS. 1A an 1B, respectively.
Figure 2B:
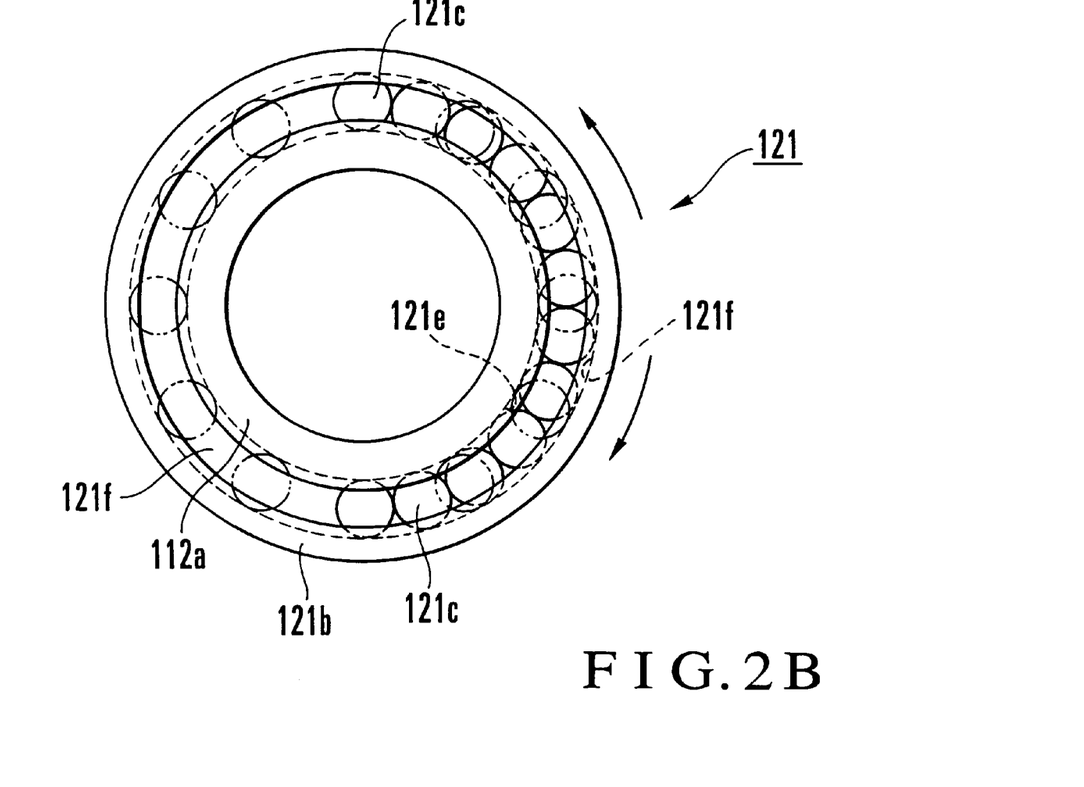
Figure 3:
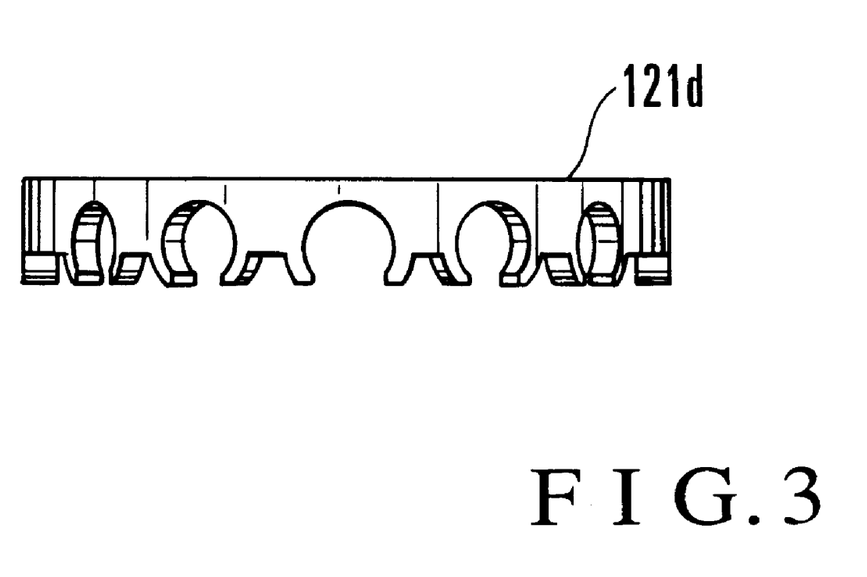
FIG. 3 is a view showing a holder having a holding function of interposing the balls in the ball bearing.

Thereafter, the outer ring 121b is moved in the planar direction from the eccentric state, as indicated by blank arrows in FIGS. 1A and 2A, to a position having the inner ring 112a as the center (to be concentric). The balls 121c are fitted in annular ball holding grooves 121e and 121f formed in the outer circumferential surface of the inner ring 112a and the inner circumferential surface of the outer ring 121b, as indicated by solid lines in FIG. 2B. Thereafter, the balls 121c are located equidistantly in the circumferential direction. A holder 121d as shown in FIG. 3, which has a function of maintaining the gap of the balls 121c, is fitted, as indicated by a blank arrow in FIG. 1B, to prevent circumferential movement of the balls 121c, thus completing assembly of the ball bearing 121.

In assembly of such a ball bearing 121, if the stepped portion 150 described above does not exist, the ball centers of the balls 121c shift downward in FIG. 10 below the edge portions of the annular ball holding grooves 121e and 121f and are sometimes supported on the surface of the assembly jig 160. If this happens, some tool must be inserted from the jig surface side to lift the balls 121c such that the ball centers are located above the edge portions of the ball holding grooves 121e and 121f. If this countermeasure is not taken, the balls 121c cannot often be fitted in the predetermined portions by moving the outer ring 121b in the planar direction.

In contrast to this, according to this embodiment, as shown in FIG. 1A, the ball centers of the balls 121c can be constantly located above the edge portions of the annular ball holding grooves 12le and 121f. In this state, when the outer ring 121b is moved in the planar direction, the balls 121c are easily pushed up and guided into the annular ball holding grooves 121e and 121f with a light force, and can be assembled always in an appropriate state. The stepped portion 150 described above functions also as a stopper for preventing eccentricity more than necessary of the outer ring 121b with respect to the inner ring 112a, as shown in FIG. 1A. With this arrangement, when the ball bearing 121 is to be formed, it can be assembled easily while allowing automatic assembly.

Figure 6A:
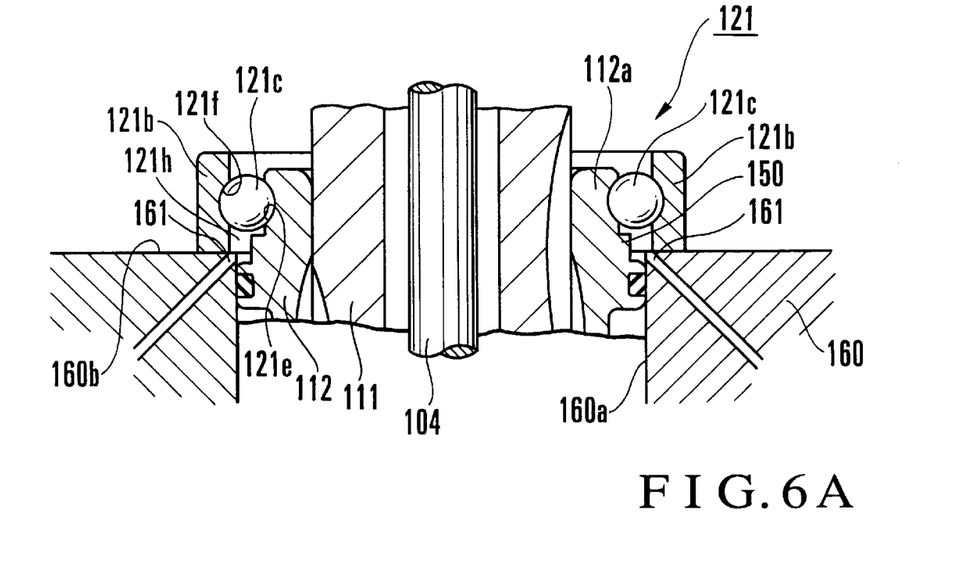
FIG. 6A is a sectional view showing the main part corresponding to FIG. 1A.
Figure 6B:
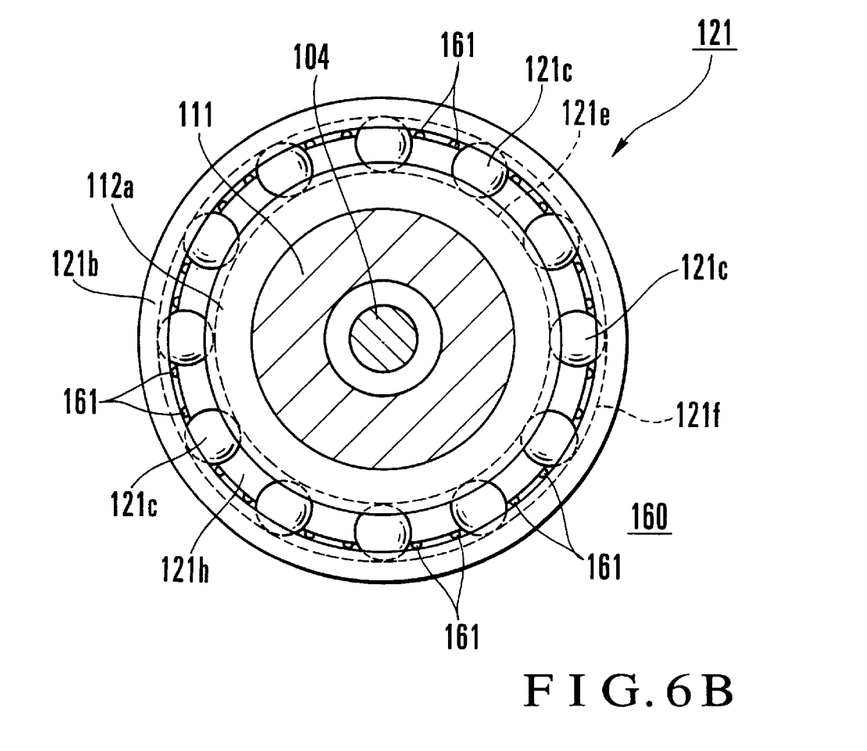
FIG. 6B is a plan view corresponding to FIG. 2B.
Figure 7:
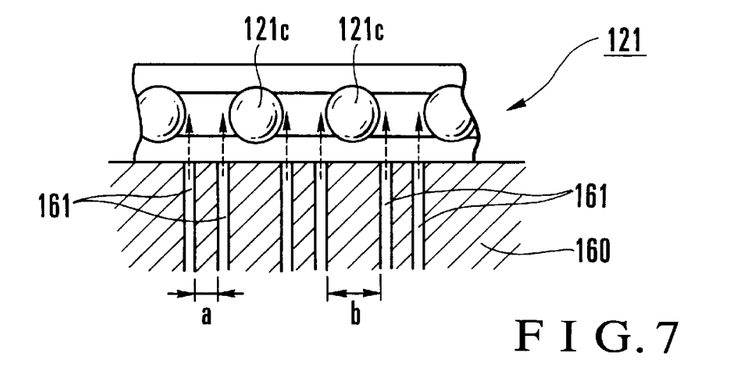
FIG. 7 is an exploding sectional view of the main part in order to explain air spray ports formed in the ball bearing assembly jig of FIGS. 6A and 6B.

FIGS. 6A, 6B, and 7 show an assembling method of the ball bearing 121 according to another embodiment of the present invention. Portions identical or corresponding to those of the embodiment described above are denoted by the same reference numerals, and a detailed description thereof will be omitted.

When assembling a ball bearing 121, the assembling method of this ball bearing uses a ball bearing assembly jig 160 having a plurality of (24 in this case) air spray ports 161 for arranging a plurality of (12 in this case) balls 121c equidistantly in an annular gap 121h between an inner ring 112a and an outer ring 121b.

In this case, as shown in FIG. 6B, a pinion shaft 103 is extended and held in a hole portion 160a of the assembly jig 160. The outer ring 121b to be fitted on the outer circumferential portion of the inner ring 112a projecting from the hole portion 160a is placed on a ridge portion 160b of the hole portion 160a. The outer ring 121b is set eccentric with respect to the inner ring 112a to partially increase the gap between the inner and outer rings 112a and 121b. The plurality of balls 121c are incorporated through this large gap portion. The outer ring 121b is moved to be located concentric with the inner ring 112a. Thereafter, air is sprayed through the air spray ports 161. As a result, the balls 121c can be moved to equidistant positions in the annular gap between the inner and outer rings 112a and 121b very easily. Thereafter, a holder 121d for maintaining the gap of the balls 121c is inserted, thereby assembling the ball bearing 121 very easily. Hence, automatic assembly can be achieved.

The air spray ports 161 of the assembly jig 160 described above are open to spray air toward the gap in the circumferential direction of the balls 121c that are located at the predetermined positions in the annular gap between the inner and outer rings 112a and 121b. The air spray ports 161 are formed in the assembly jig 160 such that a distance a between the two air spray ports 161 opposing the gap in the circumferential direction between the corresponding balls 121c is smaller than a distance b between two other air spray ports 161 for spraying air toward the two sides of the corresponding ball 121c.

The distances a and b between the air spray ports 161 and a ball diameter B satisfy a relationship a <B<b.

More specifically, with the air spray ports 161 described above, when one of the balls 121c that are eccentrically located on one side between the inner and outer rings 112a and 121b is located at a predetermined position (between the air spray ports 161 separated from each other by the distance b), an adjacent ball 121c is located between the next air spray ports 161 separated from each other by the distance b. In this manner, the adjacent balls 121c are sequentially, gradually guided to appropriate positions and are located at equidistant positions. This movement of the balls 121c caused by air flowing from the air spray ports 161 is actually performed instantaneously. Air may be sprayed from the plurality of air spray ports 161 simultaneously, or may be sprayed sequentially from one side.

Figure 8A:
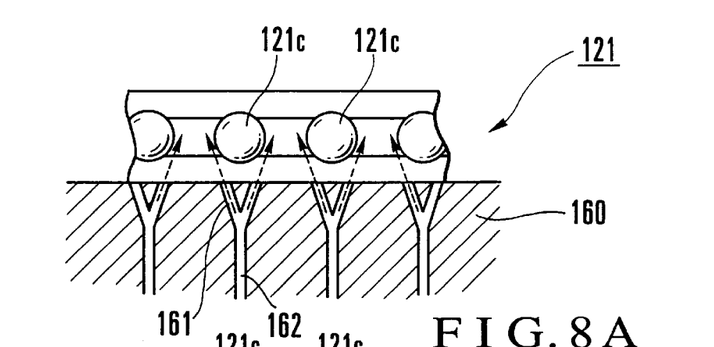
FIGS. 8A, 8B, and 8C are sectional views showing modifications of FIG. 7.
Figures 8B, 8C:
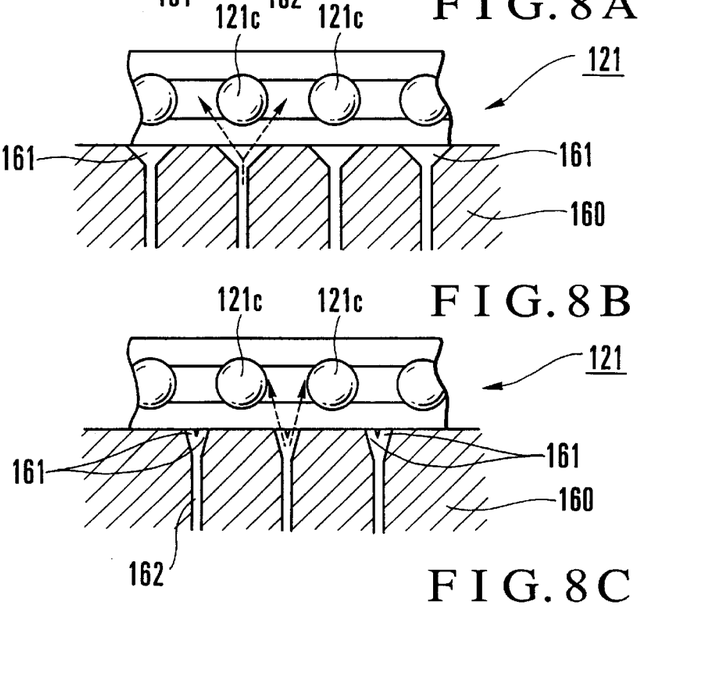

FIGS. 8A, 8B, and 8C show modifications of how to form the air spray ports 161 described above in the assembly jig 160. FIGS. 8A and 8C shows examples wherein two air spray ports 161 are branched from one air spray channel 162, and FIG. 8B shows an example wherein the air outlets of spray ports 161 are formed to have a funnel shape. It is apparent that the same function and effect identical to those of the embodiments described above can be obtained with the air spray ports 161 shown in FIGS. 8A, 8B, and 8C having these shapes.

The present invention is not limited to the structures described in the embodiments described above, but can be applied to various types of equipments and apparatuses in various fields that use a ball bearing 121, as in the power steering main body 101 of the rack-pinion type power steering apparatus, as a matter of course.

For example, in the embodiments described above, the end portion of the pinion shaft 103 (sleeve 112) on the stab shaft 102 side is formed as the small-diameter cylindrical portion 112a, and the ball holding grooves 12le are formed in the outer circumferential portion of the small-diameter cylindrical portion 112a, so that the small-diameter cylindrical portion 112a serves as the inner ring of the ball bearing 121. However, the present invention is not limited to this.

Figure 9:
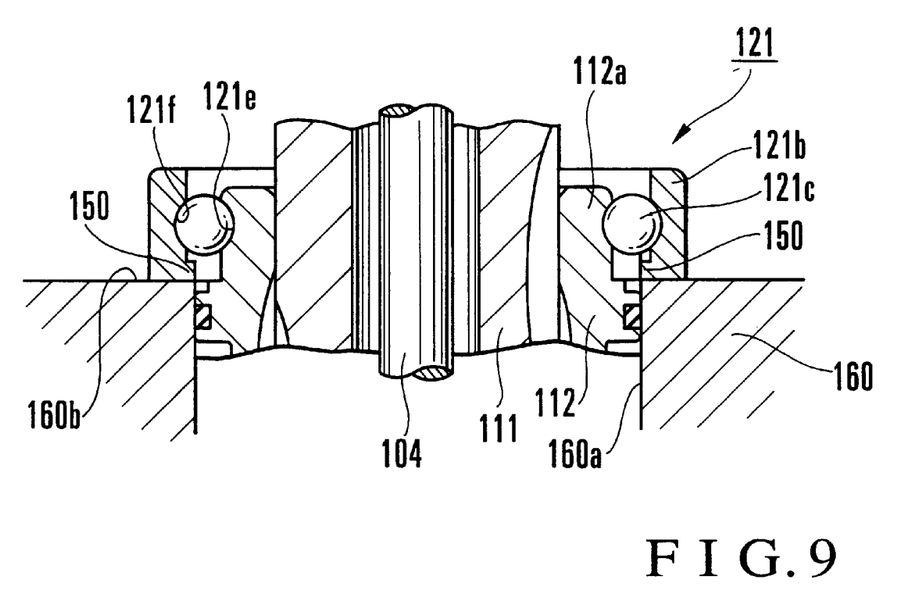
FIG. 9 is a sectional view showing the main part corresponding to FIG. 1A and shows a case wherein a stepped portion is formed on the inner circumferential surface of the outer ring.

More specifically, the end portion of the pinion shaft 103 described above may be formed to have a diameter equal to or larger than the outer diameter of the sleeve 112. An annular recess serving as a gall holding groove may be formed in the outer circumferential portion of the end portion of the pinion shaft 103. This portion formed with the ball holding groove may be used as the inner ring of the ball bearing 121, and the outer ring 121b may be fitted on this inner ring. The inner ring and the outer ring 121b may be set eccentric from each other, and the balls 121c may be incorporated. In this assembly, the annular stepped portion 150 (or a locking means similar to it) for preventing shift of the balls 121c may be formed at an appropriate position, i.e., a portion close to the small-diameter cylindrical portion 112a serving as the inner ring of the pinion shaft 103. Depending on the case, the stepped portion 150 may be formed in the inner circumferential surface of the outer ring 121b, as shown in FIG. 9.

In the above embodiments, the rack-pinion type power steering apparatus is reconsidered entirely, so that its structure is simplified, its workability and assembling performance are improved, and the cost is reduced. However, the present invention is not limited to this. For example, the structure and support structure of the stab shaft 102 and rotor 111 which forms the rotary type channel selector valve 110, the shape and structure of the valve groove and pressure fluid channel of the rotary type channel selector valve 110 formed by the rotor 111 and sleeve 112, the rack 105 and its support structure, and the like can be appropriately changed.

The axial support at the axial center located on the sleeve 112 of the pinion shaft 103 on the pinion teeth 103a side is not limited to the bush 122, but may employ a bearing structure in which this axial center is directly received by a needle bearing or the steering body 107. The axial support 123 nearer the distal end portion 103b of the pinion shaft 103 than the pinion teeth 103a constitutes a bearing structure directly received by the steering body 107. However, this portion may constitute a bearing structure employing a bush or a needle bearing.

As has been described above, according to the present invention, when constituting a ball bearing by using part of a rotary member as an inner ring, a stepped portion constituted by an annular projection or the like is formed in the outer circumferential surface of at least one of the inner and outer rings close to the ball holding groove, in order to prevent shift of the balls incorporated during assembly of the ball bearing through the gap between the inner ring and the outer ring eccentric with respect to the inner ring. Despite the simple arrangement, the following excellent effects can be obtained.

More specifically, when incorporating the plurality of balls, positional shift more than necessary of the centers of the balls from substantially the center in the direction of thickness between the inner and outer rings can be prevented by the stepped portion formed by the annular projection or the like. Thereafter, the outer ring is located concentric with the inner ring, and the balls are equidistantly arranged at predetermined gaps from each other, thereby easily assembling the ball bearing.

According to the present invention, assembling performance in assembling a ball bearing, which serves as the bearing member of a rotary member constituting the rotary type channel selector valve of, e.g., a rack-pinion type power steering apparatus, can be greatly improved.

The present invention uses a ball bearing assembly jig having a hole portion for extending and holding a rotary member therein and air spray ports for equidistantly arranging a plurality of balls in an annular gap between the inner and outer rings. After the plurality of balls are incorporated between the inner and outer rings, they can be moved to the equidistant positions in the annular gap between the inner and outer rings very easily and reliably by only spraying air from the air spray ports.

Therefore, according to the present invention, the ball can be incorporated between the inner and outer rings and can be equidistantly arranged between the inner and outer rings easily, and automatic assembly of the balls can be achieved.

For example, a rotary member refers to the sleeve of a rotary type channel selector valve integral with or integrally formed with the pinion shaft of a rack-pinion type power steering apparatus. However, the present invention is not limited to this.

For example, a stationary portion refers to a steering body that rotatably, axially supports the sleeve of a rotary type channel selector valve integral with or integrally formed with the pinion shaft of a rack-pinion power steering apparatus. However, the present invention is not limited to this.

For example, a stepped portion formed on the outer circumferential surface of an inner ring refers to an annular projection projecting from part of the outer circumferential surface of the inner ring. However, the present invention is not limited to this.

As the ball bearing assembly jig, one having air spray ports for equidistantly arranging a plurality of balls in an annular gap between inner and outer rings is used. However, the present invention is not limited to this.

A holder having a gap holding function of locating balls at predetermined gaps from each other is used. However, the present invention is not limited to this.

What is claimed is:

1. A ball bearing comprising:

a rotary member, part of which serves as an inner ring;

an outer ring fitted on an outer circumferential portion of said inner ring;

a plurality of balls interposed in ball holding grooves between said inner and outer rings; and a circumferential surface close to said ball holding grooves, in at least one of said inner and outer rings, with a stepped portion such that the lateral positional shift of said balls is prevented when said balls are introduced through a gap between said inner and outer rings while said outer ring is disposed eccentrically with respect to said inner ring during assembly of the ball bearing structure wherein said balls are maintained in equidistant positions within the ball holding grooves between said inner and outer rings by a ball holder that is incorporated into the ball beating structure after all balls have been introduced into the gap between said inner and outer rings and after the outer ring has been aligned concentrically with respect to the inner ring to move said balls into the holding grooves between said inner and outer rings.

2. A ball bearing comprising:

a rotary member, part of which serves as an inner ring;

an outer ring fitted on an outer circumferential portion of said inner ring;

a plurality of balls interposed in ball holding grooves between said inner and outer rings; and a circumferential surface close to said ball holding grooves, in at least one of said inner and outer rings, with a stepped portion such that the lateral positional shift of said balls is prevented when said balls are introduced through a gap between said inner and outer rings while said outer ring is disposed eccentrically with respect to said inner ring during assembly of the ball bearing structure wherein said stepped portion is formed by an annular projection from part of a circumferential surface of at least one of said inner and outer rings.

3. A ball bearing comprising:

a rotary member, part of which serves as an inner ring;

an outer ring fitted on an outer circumferential portion of said inner ring; and a plurality of balls interposed between the outer circumferential portion of said inner ring and the inner circumferential portion of said outer ring, said outer circumferential portion of the inner ring and said inner circumferential portion of the outer ring having circumferential ball holding grooves for holding said balls between the inner and outer rings of said ball bearing, wherein at least one of the outer circumferential portion of said inner ring and the inner circumferential portion of said outer ring has, in a position close to said ball holding grooves, at the side opposite to the side used to introduce said balls into said ball bearing, a stepped portion such that the lateral positional shift of said balls is prevented when said balls are introduced through a gap between said inner and outer rings while said outer ring is disposed eccentrically with respect to said inner ring during assembly of the ball bearing.

4. A ball bearing according to claim 3, wherein said stepped portion is formed by an annular projection from part of a circumferential surface of at least one of said inner and outer rings.

* * * * *